R. & W. L. GEBBY.
Seed-Planter.
No. 14,235.
2 Sheets—Sheet 1.
Patented Feb. 12, 1856.
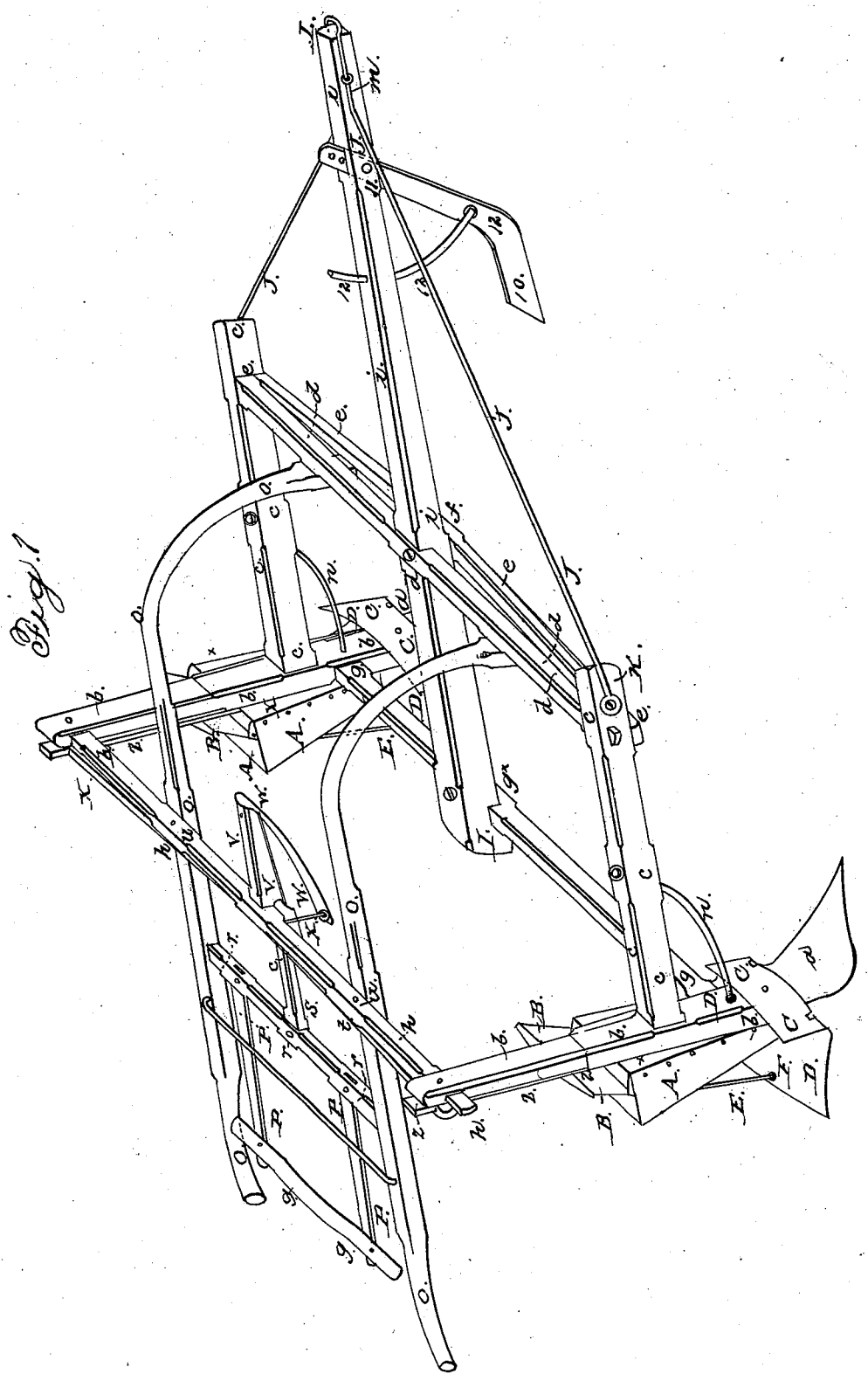

R. & W. L. GEBBY.
Seed-Planter.
No. 14,235.
Patented Feb 12, 1856.
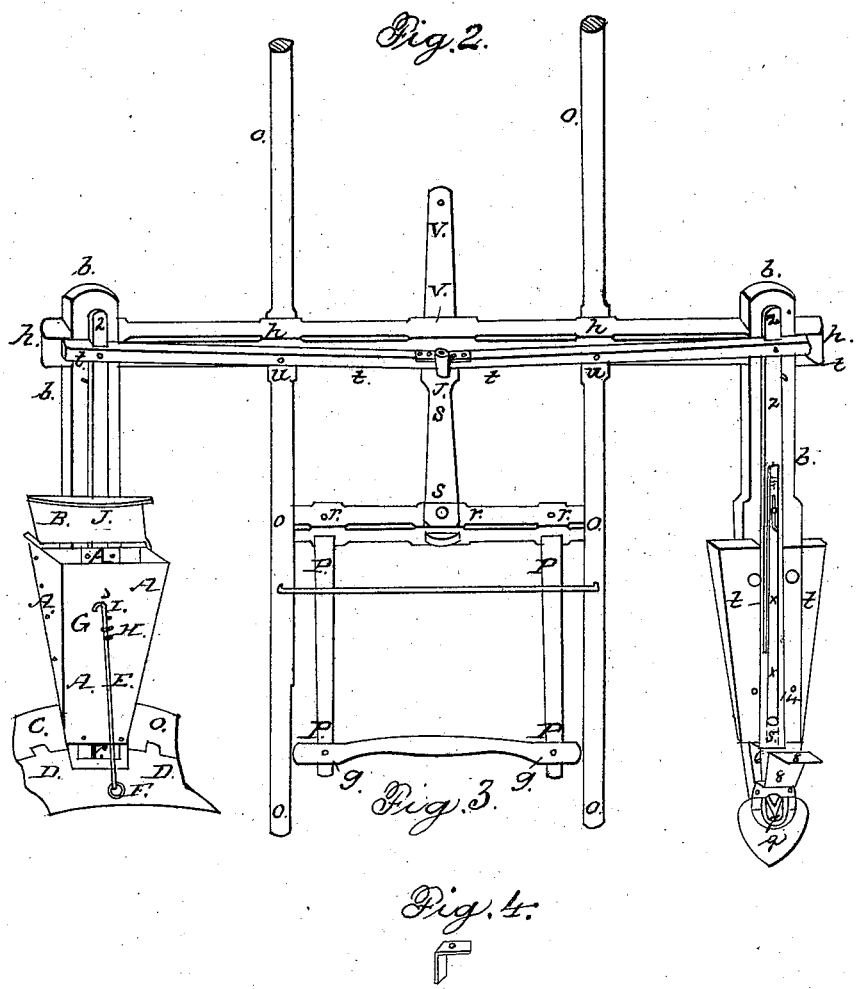

UNITED STATES PATENT OFFICE.

R. GEBBY AND W. L. GEBBY, OF NEW RICHLAND, OHIO.

IMPROVEMENT IN SEED-PLANTERS.

Specification forming part of Letters Patent No. 14,235, dated February 12, 1856.

*To all whom it may concern:*

Be it known that we, ROBERT GEBBY and WILLIAM L. GEBBY, of New Richland, in the county of Logan and State of Ohio, have invented and made certain new and useful Improvements in Corn and Seed Planters; and we do hereby declare that the following is a full, clear, and exact description of the manner of constructing the same and the operation thereof, reference being had to the accompanying drawings, making a part of this specification, in which—

Figure 1 is a perspective drawing of the machine complete. Fig. 2 is end vertical elevation, showing the hoppers and their arrangement and attachment to the cross-rail or hopper-beam, with the actuating hand-lever connected to the hopper-beam, with the valve-rods and feed-fountain, and also shows a vertical fragmental view of the handles or helves and the actuating-lever device.

To enable others to be skilled in the construction, use, and application of our improvements, we will describe them as follows, the nature and principle of which consist in forming a corn-planter or seeding-machine so as to be moved by animal-power and attended by manual agency, as in the ordinary way, but at the same time so operated that the planting of seed or grain may be so governed that there can be no liability to any omission or failure to deposit at a given regular interval two hills simultaneously by the operator actuating one common hand-lever device, and in the act of so doing the pressing of the required number of grain into their respective places of deposit and the covering and packing of the earth thereon at one operation and during the motion of the machine.

The construction of our machine is as follows: We take two shovels formed with socket-shanks, so as to slip onto ends of proper standards, as at $a\,a\,b\,b\,b\,b$, to which standards are attached in proper place, by tenon and mortise, longitudinal horizontally-arranged forward beams of suitable length, similar in form and construction to $c\,c\,c\,c\,c\,c$, Fig. 1. Next is a transverse or cross-tie rail, $d\,d\,d$, connected by tenons with the forward end of the beams $c\,c\,c\,c$, and in connection with this tie-rail is another rail, $e\,e\,e$, halved onto the ends of the under side of the beams $c\,c$ and bowed or bent, as shown at $f$. Next a bottom connection-rail, $g\,g\,g$, is attached to the standard by tenons and mortises a short distance from the shovel end or butt, and from the top ends of the standards, by mortise and tenon, an upper cross or tie rail, $h\,h\,h\,h$. This superstructure part being formed, next is employed a horizontal draft-beam, $i\,i\,i\,i$, of required shape, dimensions, and length, and this is attached longitudinally by being halved onto the cross-tie rails $d\,d\,d$ and connection-rail $g\,g$, and supported and counterbraced by the curved rail $e\,e\,e\,f$. The draft-beam $i\,i\,i\,i$ is stayed or braced by a rod or stiffening-bar, $j\,j\,j\,j\,j\,j$, bent around the end of the beam, forming a clevis or hitching-place, and kept fast by staples $m$. The ends of this rod are formed with eyes or holes, and pinned or bolted onto the sides of the beams $c\,c\,c\,c$, as at $k\,k$. The beams $c\,c\,c\,c$ are also braced or stayed by rods $n\,n$, screwed into the standards $b\,b$. Next are employed handles or helves $o\,o\,o\,o\,o$, curved or bowed and bolted onto the inner side of the cross-rails $d\,d\,d\,d$ and screwed or bolted onto the under side of the top or upper cross-tie rail, $h\,h\,h\,h$. Next is employed a hand-lever device, $p\,p\,q\,q$, having an axle-bar, $r\,r\,r$, with pivot or journal ends formed and fitted into the handles or helves $o\,o\,o\,o$. To the center of the axle-bar $r\,r\,r$ is mortised an extension or trigger-piece device, $s\,s$, and upon the end of which rests the ends of two levers, $t\,t\,t\,t$, working on centers or fulcrums at $u\,u$, Figs. 1, 2. These fulcrums are pins or bolts passing horizontally through the top cross-rail, $h\,h\,h\,h$. In the center, to the under side of this cross-rail $h\,h$, is attached a spur-piece, $v\,v\,v$, to which is affixed a flat flexible strip of metal or spring device, $w\,w$, and to the unconfined end of which is linked vertically a short wire, $x$, which is attached to a small hook or catch, $y\,y$, formed of a small strip of thin metal, and in shape as shown in Fig. 4. This hook or catch rests on the top of the lever-rods $t\,t\,t\,t$. These horizontally-arranged lever-rods have their outward ends mortised through, into which mortises are fitted vertical-sliding strips $z\,z\,z\,z$. The mortises are large enough to admit of the sliding strips or valve-rods to work or play sufficiently, so as to maintain a uniform vertical position. These sliding strips or valve-rods $z\,z\,z\,z$ rest on the back part of the standards $b\,b\,b\,b$, and are inserted in grooves or guide-places formed by two sections of wood, $^{\times\,\times}$, screwed to the standards, and which also serve to form the back part of the hoppers or seed-fountain. About half the length of these sliding strips or valve-rods are grooves or gutters, into which work neatly adjustable graduating feeding-valve sticks or pistons * * * *, their upper ends being formed with an oblong vertical slot, into which is fixed an adjusting tightening-screw, thus forming a compound or double graduating feeding-valve rod device. Through the lower ends of the sliding rods $z\ z\ z\ z$ are formed oblique or sloping openings 5, communicating into a seeding or grain-supply chamber formed partly by hollowing out or grooving the lower ends of the standards, as at 7 7, Fig. 2, and partly by a piece of tin or thin metal or wood, formed and shown as at 8 8, and screwed up closely against the ends of the standards. The lower edge of this piece of tin has a pointed or lozenge-like formation, intended to spread or scatter the grain or seed in its passage out of the hopper, so as not to fall in one pile or heap, but instead to be slightly scattered with the hill or place of deposit. This formation is shown at 9, Fig. 2. These several devices being complete, next the seed-hopper or grain-fountain may be formed of any suitable wood or metal and attached to the standard by being screwed or nailed onto the standards, and thus forming the fountains or hoppers A A A A, Figs. 1, 2. These fountains may be provided with falling or hinged tops B B, with suitable fastenings. These several parts being completed, next is formed and arranged to the shovels $a\ a$, fender-plates or skimmers C C, which may be screwed or bolted onto the front part of the shovels. To these fender-plates are attached, by hinges or in any equivalent manner, adjustable flap plates or packers D D, to which are connected adjusting lifting-rods E E, Figs. 1, 2. These rods are linked or hooked to the packers, and at the handle part formed with pins, or hooks, or teeth H, and this handle part G is intended to hook or catch into the staple or eye I, inserted in the back part of the hopper. The draft-beam $i\ i\ i\ i$, toward its forward end, has a longitudinal mortise, formed wider underneath than at upper side, as indicated by the dots. Into this mortise is inserted a support guide-runner, 10 10 10, and is confined on a horizontal axis or fulcrum, 11. At about one-third of the length of this guide-runner is formed a hole, into which is inserted a curved rod to work similar to a joint, as at 12 12 12, Fig. 1.

The operation of the seeder is as follows: The corn to be planted is put into the seeding-hoppers A A A A, and as the machine advances, the operator at given intervals presses down with his hand the bar $p\ p$ of the hand-lever, and in doing this the trigger device $s\ s$ presses upward, and in so doing operates the levers $t\ t\ t\ t$, which actuate the sliding strips $z\ z\ z\ z$, which being formed with the feed vents or openings 5, and in the act of being depressed carries down with them in their course, the required number of grains or kernels of corn, and also in doing this presses down the grain or seed into the hill or place of deposit, and this being done, the hand is instantly taken off the pedal, when the sliding strips or valve-rods $z\ z\ z\ z$ rise up in their original position, and in doing this the vent or feed-escape 5 is again opened, and in the act of opening the required number or quantity of grain enter the vent preparatory to the being dropped in the next hill preceding the last deposit. From this peculiar arrangement of feed vent or escape, the egress-place can never be surcharged or choked up, for the little stirrer or spur pin 14, attached toward the end of the piston or valve rod, in moving up and down, effectually loosens the supply of grain and prevents any choking or clogging. In the progress of the machine as it passes along the furrow formed by the shovel $a\ a$, and owing to the oval-shaped surface thereof, the loose earth or soil falls completely over the deposited grain, and is continuously packed down closely, and owing to the bowed or concave shape of the flap the soil is formed in a ridge-like manner, and thus the deposited grain is enabled to take deep root, and is attended with the least liability to be beaten out of its bed, but kept securely sustained in the soil.

It will be perceived that the flap can be elevated or depressed by aid of the adjusting-rod E, and through this rod more or less pressure may be given the soil, as occasion may require. This flap may be made heavy, if desired, so that its overweight may tend to press the soil compactly.

The runner-guide is also adjustable through the intervention of the graduating-rod 12 12 12, so as to elevate or depress, when required, in turning up the furrow, and by which means the furrow also can be made deeper or shallow.

Deeming it unnecessary to enter more into detail upon the construction or utility and merits of our invention, as the farmers or agriculturists will decide respecting its value as an implement the best adapted to their purposes; and having described the nature and construction of our corn and seed planter, what we claim as new and original with ourselves, and desire to have secured by Letters Patent of the United States, is as follows:

1. Constructing a corn-planter with a compound or double graduating feeding-valve-rod device $z\ zzz$ * * * * 5, having a stirrer pin or spur, 14, and combined in operation with the actuating-lever device $p\ p\ q\ q\ r\ r$, formed with the trigger $s\ s$, and spur $v\ v$, and spring, hook, or catch device $w\ w\ x\ y\ y$, constructed and used substantially in the manner described.

2. The skimmer-fender C C, formed with a hinged flap or pressure plate D D and adjusting-rod E F G H, as described.

ROBT. GEBBY. [L. S.]
WILLIAM L. GEBBY. [L. S.]

Witnesses:
JAMES T. TIMMS,
JOHN S. HOLLINGSHEAD.